(12) United States Patent
Kobayashi et al.

(10) Patent No.: US 7,986,462 B2
(45) Date of Patent: *Jul. 26, 2011

(54) SCANNING IMAGE DISPLAY APPARATUS

(75) Inventors: Shuichi Kobayashi, Yokohama (JP); Akira Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/481,821

(22) Filed: Jun. 10, 2009

(65) Prior Publication Data

US 2009/0310199 A1   Dec. 17, 2009

Related U.S. Application Data

(63) Continuation of application No. 11/834,413, filed on Aug. 6, 2007, now Pat. No. 7,564,630.

(30) Foreign Application Priority Data

Aug. 11, 2006   (JP) ................................. 2006-219685

(51) Int. Cl.
*G02B 27/14* (2006.01)

(52) U.S. Cl. ....................................................... 359/630

(58) Field of Classification Search .................. 359/630
See application file for complete search history.

(56) References Cited

U.S. PATENT DOCUMENTS

| | | | |
|---|---|---|---|
| 5,467,104 A | 11/1995 | Furness, III et al. | |
| 6,144,493 A | 11/2000 | Qkuyama et al. | |
| 6,157,352 A | 12/2000 | Kollin et al. | |
| 6,259,561 B1 * | 7/2001 | George et al. | 359/566 |
| 6,351,332 B1 | 2/2002 | Okyuama et al. | |
| 6,445,362 B1 | 9/2002 | Tegreene | |
| 6,657,763 B2 | 12/2003 | Kobayashi | |
| 6,822,773 B2 * | 11/2004 | Kobayashi | 359/196.1 |
| 6,922,285 B2 | 7/2005 | Kobayashi | |
| 6,937,221 B2 * | 8/2005 | Lippert et al. | 345/98 |
| 7,183,539 B2 | 2/2007 | Kobayashi et al. | |
| 2008/0212195 A1 | 9/2008 | Yamamoto | |

FOREIGN PATENT DOCUMENTS

JP   2004-347687   12/2004

* cited by examiner

*Primary Examiner* — Ricky L Mack
*Assistant Examiner* — Vipin M Patel
(74) *Attorney, Agent, or Firm* — Fitzpatrick, Cella, Harper & Scinto

(57) ABSTRACT

A scanning type image display apparatus is disclosed which is capable of forming an exit pupil with a shape and a size which facilitate observation. The apparatus includes a scanning unit, a first optical system introducing a light flux to the scanning unit, a second optical system converging the light flux from the scanning unit, a diffractive optical element receiving the converged light flux, and an ocular optical system. Two directions in diametral directions of the light flux are first and second directions. The optical element increases the divergent angles of an emerging light flux therefrom in the first and second directions as compared with the convergent angles of an incident light flux thereinto in the two directions and increases the divergent angle of the emerging light flux in the first direction as compared with the divergent angle thereof in the second direction.

6 Claims, 16 Drawing Sheets

SCANNING IMAGE DISPLAY APPARATUS

This is a continuation of co-pending U.S. patent application Ser. No. 11/834,413, filed Aug. 6, 2007.

BACKGROUND OF THE INVENTION

The present invention relates to a scanning-type image display apparatus which, mainly, is mounted on the head of a user and allows the user to observe an image by scanning a light flux on an eye (retina) of the user.

A retina 1 scanning-type image display apparatus has been disclosed, for example, in U.S. Pat. No. 5,467,104, Japanese Patent Laid-Open No. 2004-347687, and U.S. Pat. No. 6,157,352. In those retinal scanning-type image display apparatuses, a scanning device and an ocular optical system are used to perform two-dimensional scanning of red light, green light, and blue light from a light source on a retina of an observer to allow observation of an image.

In those retinal scanning-type image display apparatuses, a scanning device having a small size and capable of fast scanning of light is used in order to realize a higher resolution. Since such a small scanning apparatus is used, a light beam for scanning needs to have a very small diameter.

This involves the problem of the likelihood of vignetting in images since the diameter of the light beam is also small in the exit pupil area in which the eye of an observer is placed. A method for increasing the diameter of the exit pupil is to dispose an exit pupil expander in an optical system of a retinal scanning-type image display apparatus as disclosed in U.S. Pat. No. 6,157,352. Specifically, an exit pupil expander such as a lens array and a diffusing plate is disposed close to the position of the intermediate image plane of the optical system to provide the divergent angle of a light flux emerging from the exit pupil expander that is larger than the divergent angle of the light flux entering the exit pupil expander, thereby increasing the diameter of the exit pupil.

When the exit pupil expander as disclosed in U.S. Pat. No. 6,157,352 is used, however, the following problem arises if the emergence angle of the light emerging from the exit pupil expander is significantly larger than the angle of the light entering the exit pupil expander. Specifically, although the diameter of an area (exit pupil) for allowing an observer to see an image is increased, the amount of light reaching the eyes of the observer is relatively small, presenting a darker image. In addition, the diffused light may serve as stray light to make it difficult to perform favorable image observation.

The diameter (width) of the exit pupil formed by the light emerging from the exit pupil expander in a certain direction is equal to that in a direction orthogonal thereto. Thus, when a rectangular image is displayed, a loss of light amount is not satisfactorily small in that optical system.

BRIEF SUMMARY OF THE INVENTION

The present invention provides a scanning-type image display apparatus capable of forming an exit pupil with a shape and a size which facilitate observation by an observer and achieving a reduced loss of light from a light source.

A scanning-type image display apparatus as one aspect of the present invention includes a scanning unit which two-dimensionally scans a light flux, a first optical system which introduces a light flux from a light source to the scanning unit, a second optical system which converges the light flux from the scanning unit, a diffractive optical element which receives the converged light flux from the second optical system, and an ocular optical system which introduces the light flux from the diffractive optical element to an eye of an observer. When two directions orthogonal to each other in diametral directions of the light flux from the second optical system are a first direction and a second direction, the diffractive optical element has a function of increasing the divergent angles of an emerging light flux from the diffractive optical element in the first and second directions as compared with the convergent angles of an incident light flux entering the diffractive optical element in the first and second directions. It also has a function of increasing the divergent angle of the emerging light flux in the first direction as compared with the divergent angle thereof in the second direction.

An image display system as another aspect of the present invention includes the above-described image display apparatus and an image supply apparatus.

Other objects and features of the present invention will become apparent from the following description and the attached drawings.

DESCRIPTION OF THE EMBODIMENTS

Embodiments of the present invention will hereinafter be described with reference to the accompanying drawings.

Embodiment 1

Figure 1:
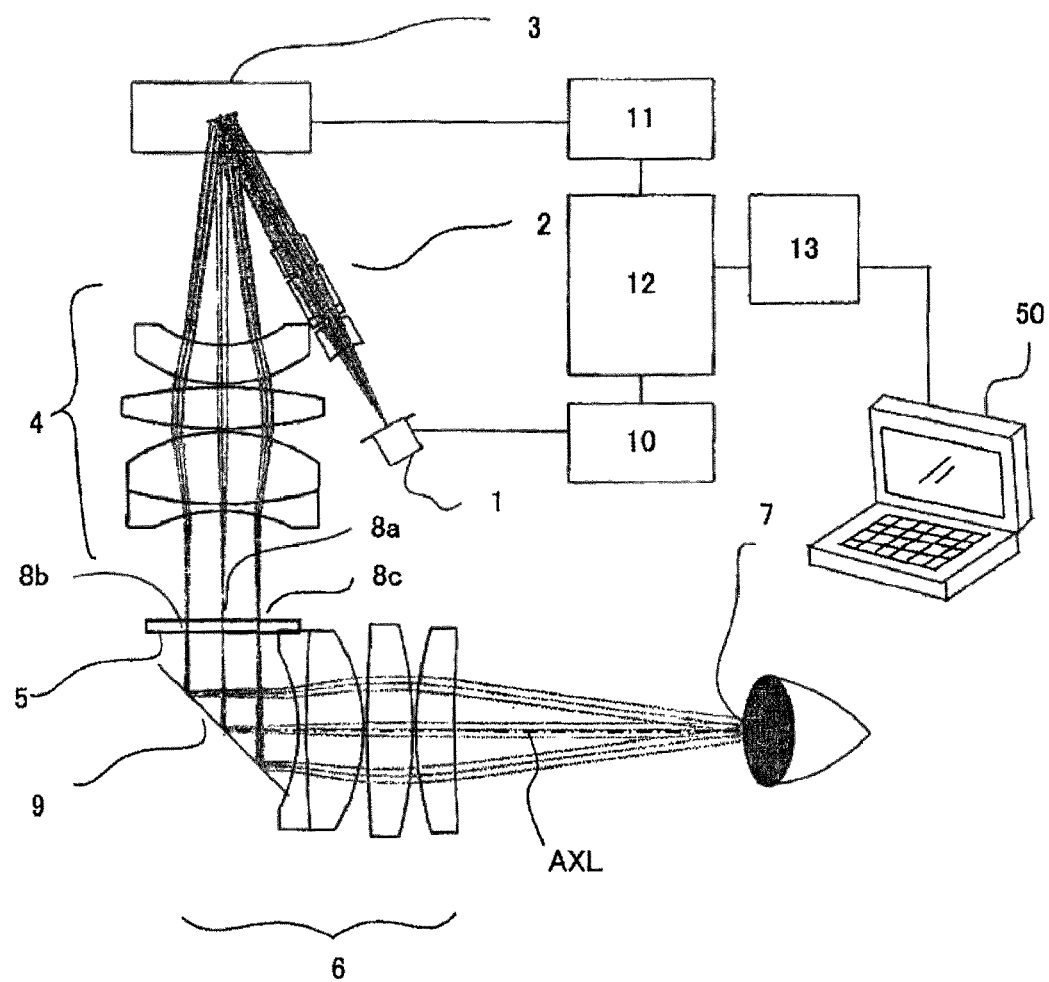
FIG. 1 is a figure showing the configuration of a retinal scanning-type image display apparatus which is Embodiment 1 of the present invention.

FIG. 1 shows the configuration of a retinal scanning-type image display apparatus which is Embodiment 1 of the present invention. A light source 1 is capable of modulating the intensity of light which is emitted therefrom. A light flux emitted from the light source 1 passes through a first optical system 2 which serves as a light source optical system, and then enters a two-dimensional scanning unit 3.

The two-dimensional scanning unit 3 is a light deflector of a reflection-type formed of a Micro Electro-Mechanical System (MEMS) manufactured by using semiconductor-manufacturing processes.

The light flux deflected by the two-dimensional scanning unit 3 enters a second optical system 4 which serves as a collecting optical system. The second optical system 4 converges the light flux from the light source 1 at the position where a diffractive optical element 5 is placed, and forms a scanned surface. Light fluxes 8a, 8b, and 8c are examples of the light flux deflected by the two-dimensional scanning unit 3.

Preferably, the position of the diffractive optical element 5 coincides with the position of the scanned surface. However, they do not necessarily need to coincide with each other. They only need to be placed within an area in which they can be considered to optically coincide with each other.

The light flux after the diffraction by the diffractive optical element 5 enters an ocular optical system 6 via a reflecting mirror 9. An observer puts his eye in the area where an exit pupil 7 is formed by the light flux emerging from the ocular optical system 6, so that he/she can observe an image formed on the abovementioned scanned surface as a virtual image through the ocular optical system 6. 'AXL' represents the optical axis of the optical systems of the image display apparatus. The optical axis AXL corresponds to the optical path on which a principal ray proceeds from the light-emitting point of the light source 1 to the center of the exit pupil 7 after passing through the centers of the first and second optical systems 2 and 4.

The optical source 1 is electrically connected to a light source control circuit 10. The two-dimensional scanning unit 3 is electrically connected to a scanning control circuit 11. An image information input circuit 13 is electrically connected to an image supply apparatus 50 such as a personal computer, a DVD player, and a television tuner. The image display apparatus and the image supply apparatus 50 constitute an image display system.

The image information input circuit 13 outputs a signal corresponding to image information input thereto from the image supply apparatus 50 to a main control circuit 12. The main control circuit 12 controls the light source control circuit 10 and the scanning control circuit 11 based on the signal from the image information input circuit 13 such that the circuits 10 and 11 are synchronized. In this manner, the image corresponding to the image information input from the image supply apparatus 50 can be presented to the observer.

Figure 2:
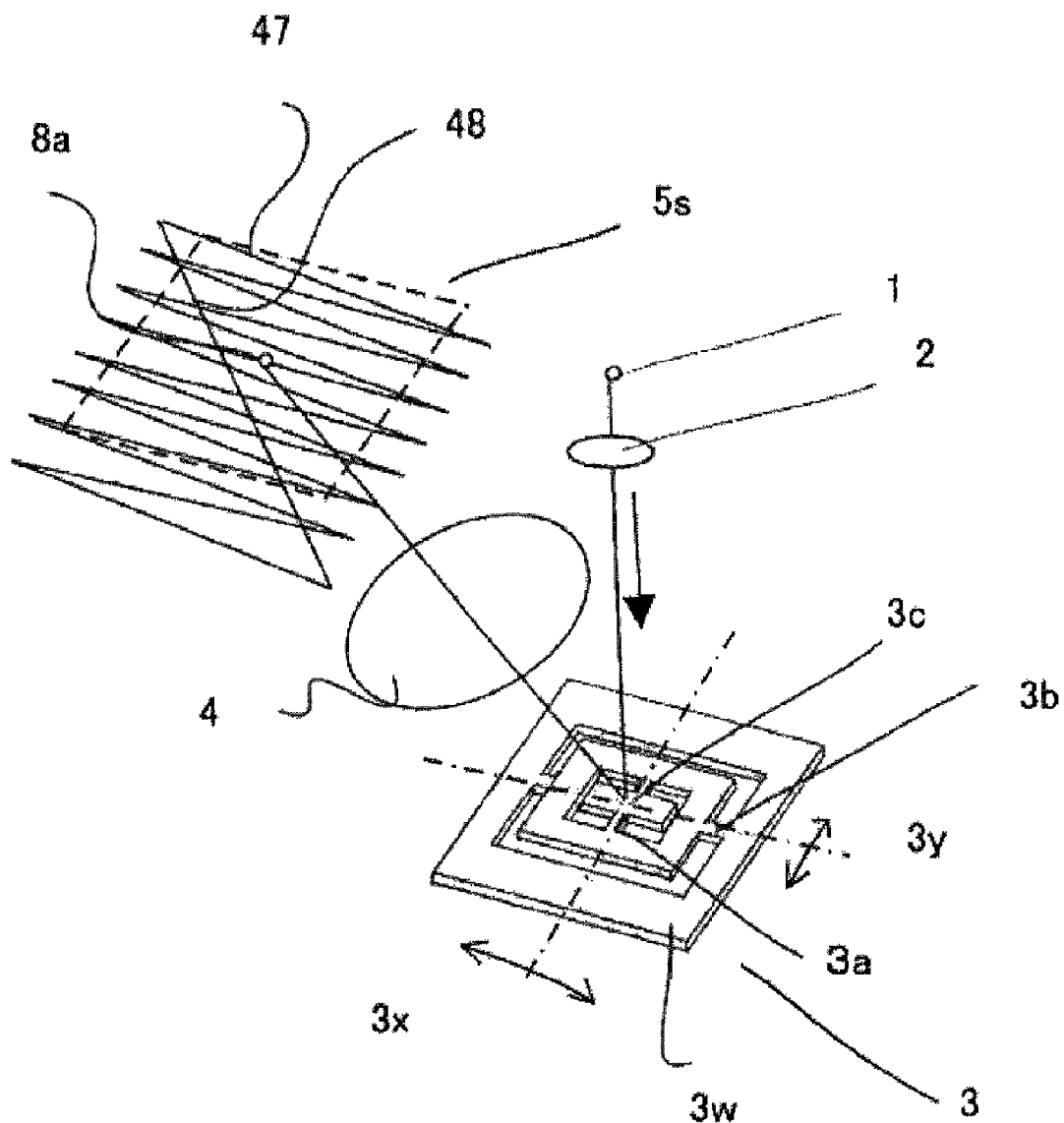
FIG. 2 is a figure for explaining how to form an image in the retinal scanning-type image display apparatus of Embodiment 1.

Description will hereinafter be made of how to make an image by the light source 1 and the two-dimensional scanning unit 3 in the retinal scanning type image display apparatus of Embodiment 1 with reference to FIG. 2.

The light flux emitted from the light source 1 enters the two-dimensional scanning unit 3 via the first optical system 2. Specifically, the light flux enters a deflecting mirror surface 3c in the two-dimensional scanning unit 3.

The deflecting mirror surface 3c is held by a substrate 3w via torsion bars 3a and 3b which extend in directions orthogonal to each other. Upon application of electromagnetic force or electrostatic force from an actuator, not shown, the deflecting mirror surface 3c is rotated around the two orthogonal axes with twisting of the torsion bars 3a and 3b to change the reflection direction of the incident light flux. The torsion bars 3a and 3b, and the deflecting mirror surface 3c are formed integrally with the substrate 3w by using the MEMS technology described above. Thus, the two-dimensional scanning unit 3 is extremely small and capable of fast operation.

The light flux deflected (reflected) by the two-dimensional scanning unit 3 configured as above enters the second optical system 4.

The light-emitting point of the light source 1 is conjugate to a scanned surface 5s via the first optical system 2 and the second optical system 4. The image of the light source 1 is formed as a spot 8a in FIG. 2, for example. The two-dimensional scanning unit 3 can deflect the light flux in two directions 3x and 3y orthogonal to each other, that is, two-dimensionally scan the light flux. For example, as shown in FIG. 2, the two-dimensional scanning unit 3 can perform raster scanning with a scanning line 47 and a flyback line 48 on the scanned surface 5s. The two-dimensional scanning can be synchronized with the modulation of the light source 1 to form an image on the scanned surface 5s.

Next, the effect of the diffractive optical element 5 will be described with reference to FIGS. 3A and 3B which schematically show a light flux around the diffractive optical element 5 in a section in a horizontal direction (H) serving as a first direction and in a section in a vertical direction (V) serving as a second direction, respectively.

The horizontal and vertical directions are also two directions orthogonal to each other in the diametral directions of the light flux.

The horizontal direction corresponds to a direction of the long side of a rectangular image presented to the observer, while the vertical direction corresponds to a direction of the short side of the image. However, the horizontal direction may correspond to the short side direction of the image and the vertical direction may correspond to the long side direction of the image.

Figure 3A:
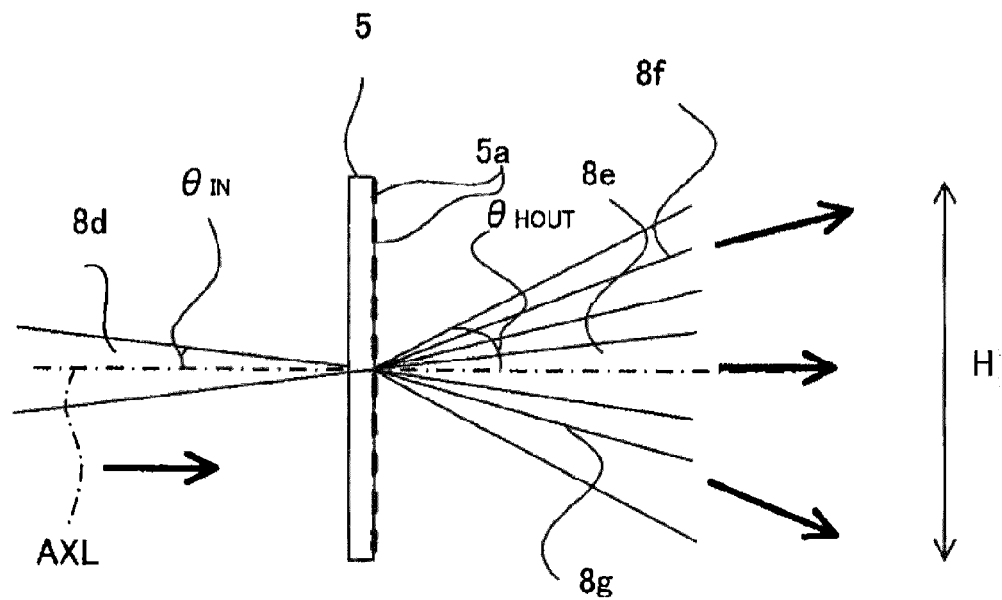
FIG. 3A is a figure for explaining the optical effect in a horizontal section of a diffractive optical element used in the retinal scanning-type image display apparatus of Embodiment 1.
Figure 3B:
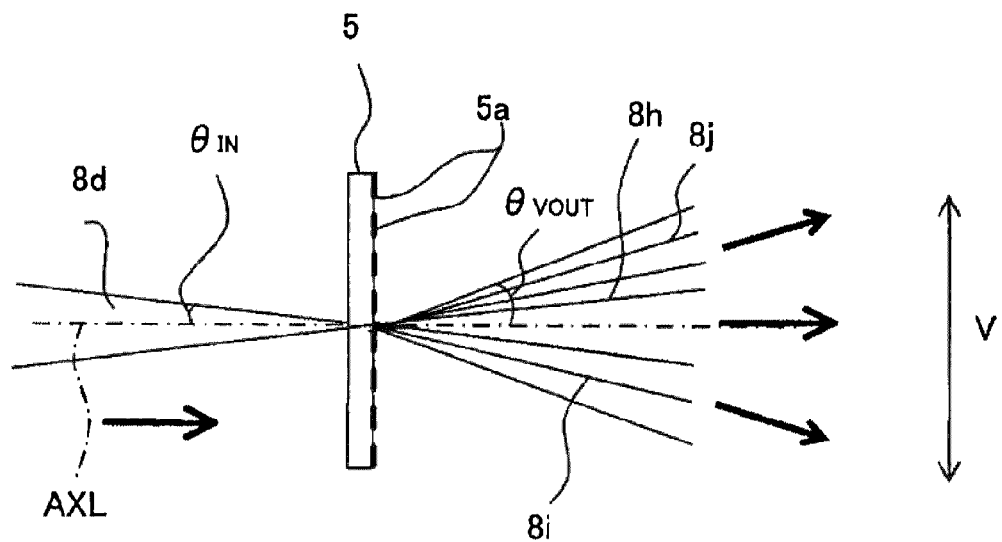
FIG. 3B is a figure for explaining the optical effect in a vertical section of the diffractive optical element in Embodiment 1.

In FIGS. 3A and 3B, a light flux 8d shows an example of a light flux entering the diffractive optical element 5. The incident light flux 8d proceeds toward the diffractive optical element 5 while it converges at an angle of $\theta_{IN}$ (hereinafter referred to as a convergent angle in Embodiment 1) in the horizontal direction and the vertical direction with respect to the central axis (shown by a dash dotted line in FIGS. 3A and 3B and coincident with the optical axis AXL in FIGS. 3A and 3B), and forms a convergence point at the position where the diffractive optical element 5 is placed. The convergent angles of the incident light flux 8d are the same for the horizontal direction and the vertical direction.

The diffractive optical element 5 has a minute periodic structure 5a formed thereon. The periodic structure 5a diffracts the incident light flux 8d. In the horizontal direction shown in FIG. 8A, light rays 8e, 8f, and 8g represent part of the diffracted light flux (emerging light flux) emerging from the diffractive optical element 5. The emerging light flux represented by the light rays 8e, 8f, and 8g diverges to form an angle $\theta_{HOUT}$ (hereinafter referred to as a divergent angle) larger than the convergent angle $\theta_{IN}$ of the incident light flux 8d with respect to the central axis.

In the vertical direction shown in FIG. 3B, light rays 8h, 8i, and 8j represent part of the diffracted light flux (emerging light flux) emerging from the diffractive optical element 5. The emerging light flux represented by the light rays 8h, 8i, and 8j diverges to form a divergent angle $\theta_{VOUT}$ larger than the convergent angle $\theta_{IN}$ of the incident light flux 8d with respect to the central axis.

The following relationships hold:

$$\theta_{IN} < \theta_{HOUT}$$

$$\theta_{IN} < \theta_{VOUT}$$

$$\theta_{VOUT} < \theta_{HOUT}.$$

That is, the diffractive optical element 5 has the function of increasing the divergent angles $\theta_{VOUT}$ and $\theta_{HOUT}$ of the emerging light flux in the vertical and horizontal directions as compared with the convergent angle(s) $\theta_{IN}$ of the light flux entering the diffractive optical element 5 in the vertical and horizontal directions. The diffractive optical element 5 also has the function of increasing the divergent angle $\theta_{HOUT}$ of the emerging light flux in the horizontal direction as compared with the divergent angle $\theta_{VOUT}$ in the vertical direction.

Figure 4:
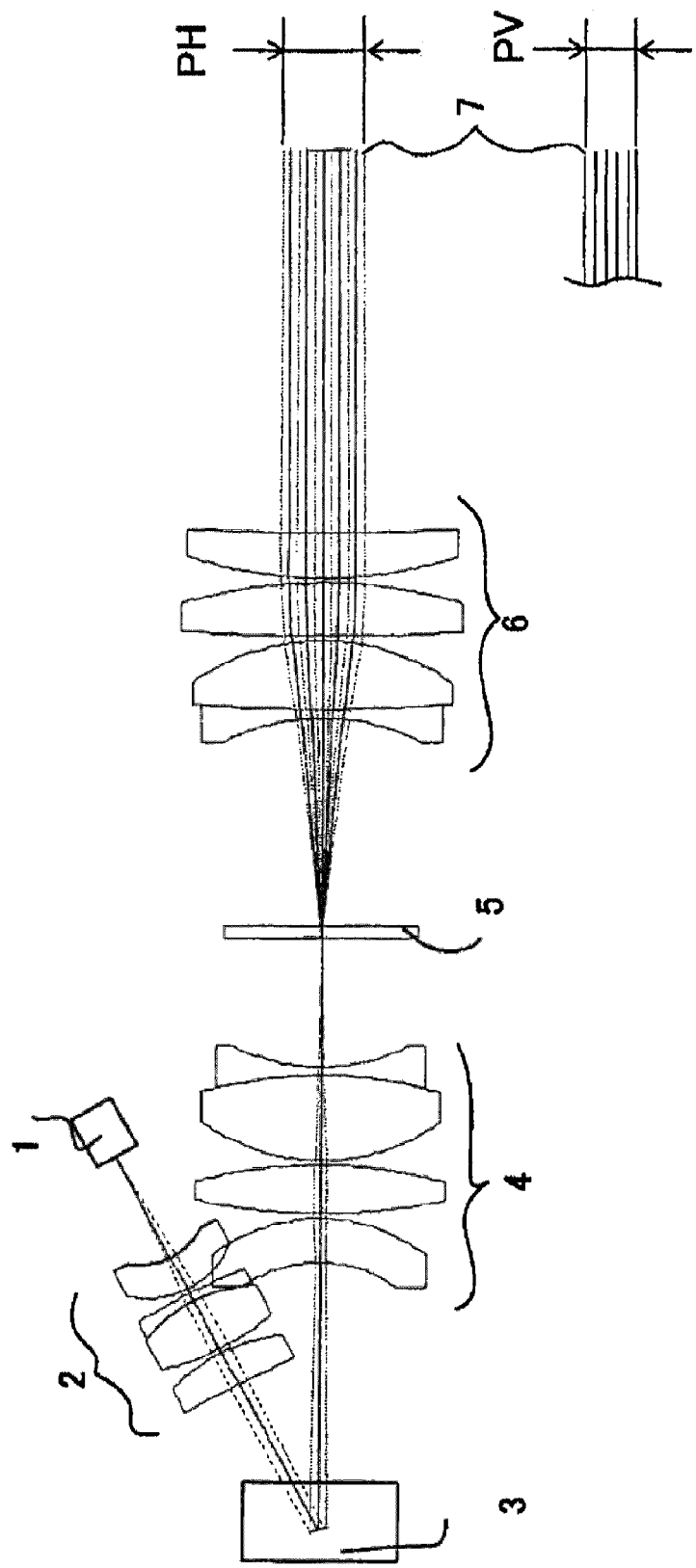
FIG. 4 is a figure for explaining the optical effect of the retinal scanning-type image display apparatus of Embodiment 1.

FIG. 4 shows the optical systems shown in FIG. 1 developed at the position of the reflecting mirror 9. The emerging light flux, which has the divergent angle larger than the convergent angle through the diffractive optical element 5 as described above, forms the exit pupil 7 via the ocular optical system 6. The size PH of the exit pupil 7 in the horizontal direction (H) is shown in an upper portion of FIG. 4. The size PV of the exit pupil 7 in the vertical direction (V) is shown in a lower portion of FIG. 4. PH and PV have the following relationship:

$$PV < PH.$$

Figure 5A:
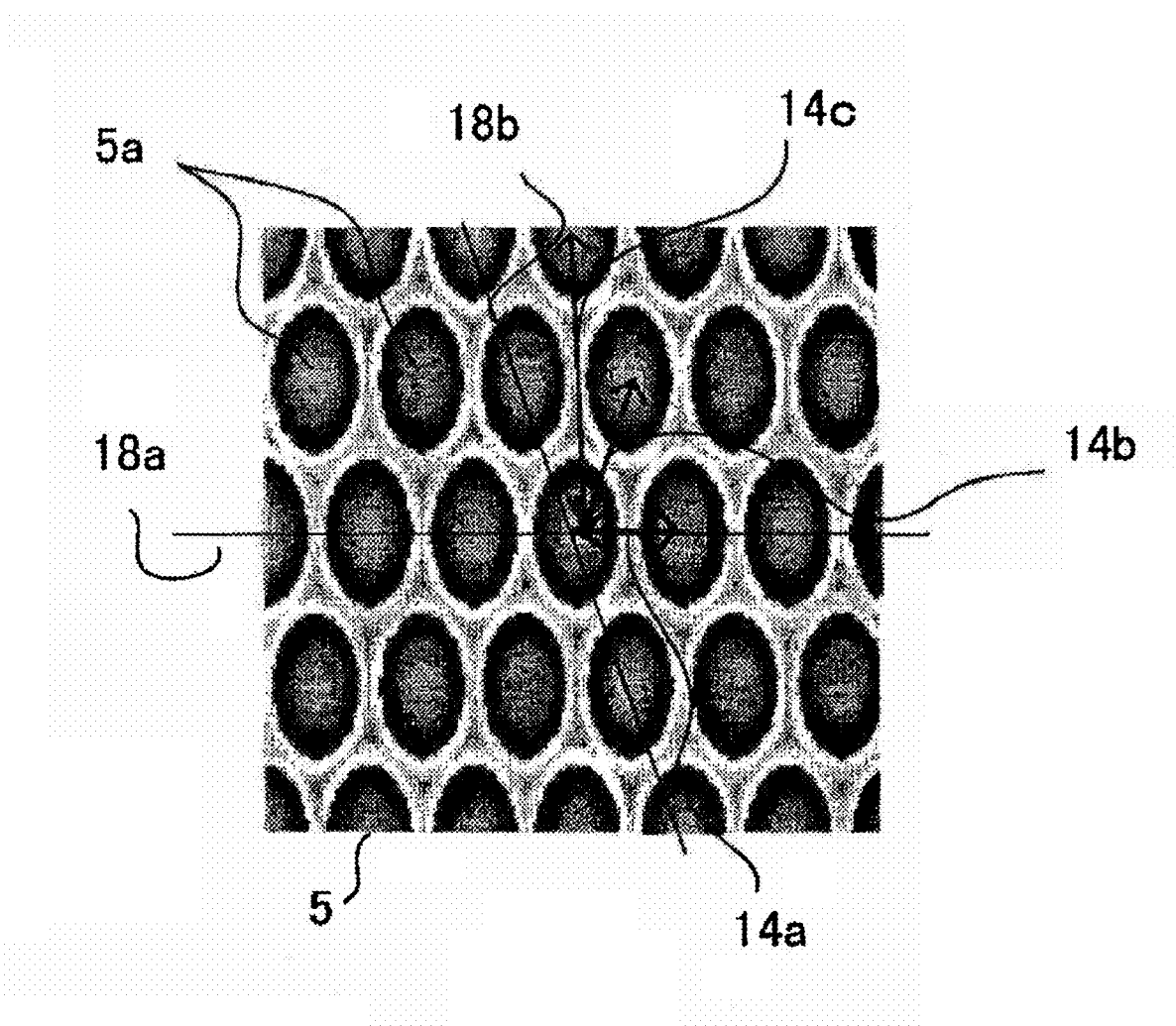
FIG. 5A is a figure showing the shape of the diffractive optical element in Embodiment 1.

FIG. 5A shows an example of the shape of the diffractive optical element 5. The diffractive optical element 5 is formed of a transmissive micro-lens array including a plurality of micro-lenses (hereinafter referred to as micro-lenses 5a) arranged regularly as the periodic structure 5a shown in FIGS. 3A and 3B. The micro-lenses 5a are arranged with a first periodic pitch 14a in a horizontal direction 18a and with a second periodic pitch 14b larger than the first periodic pitch 14a in an inclined direction 18b with respect to the horizontal direction 18a and a vertical direction. The micro-lenses 5a are arranged with a third periodic pitch (a combined periodic pitch of the first periodic pitch 14a and the second periodic pitch 14b) 14c larger than the second periodic pitch 14b in the vertical direction.

Figure 5B:
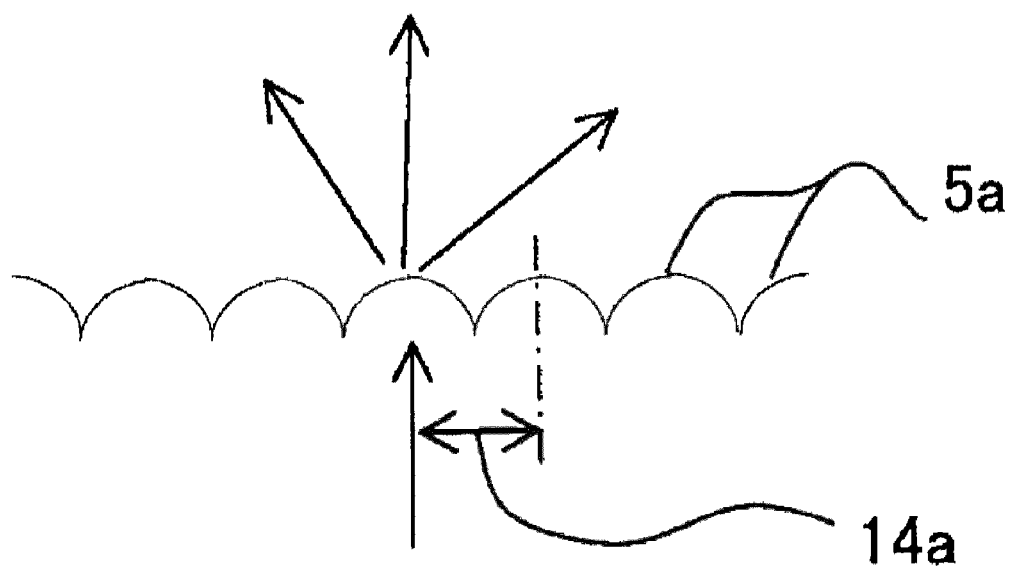
FIG. 5B is a figure showing the sectional shape of the diffractive optical element in Embodiment 1.
Figure 5C:
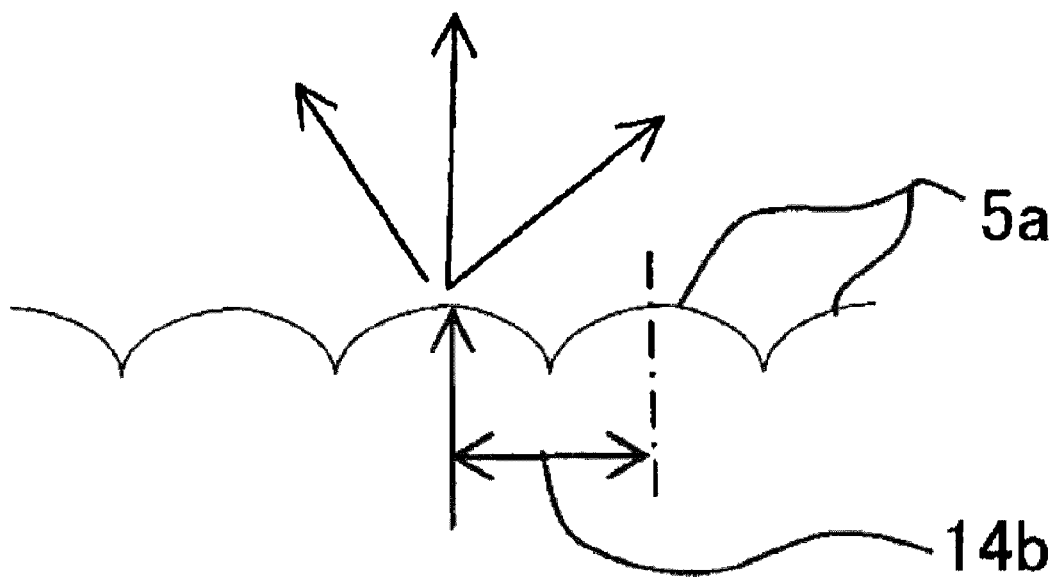
FIG. 5C is a figure showing the sectional shape of the diffractive optical element in Embodiment 1.

FIGS. 5B and 5C show the sectional shapes in the directions 18a and 18b for the periodic pitches 14a and 14b, respectively. The micro-lens array is formed of an optically transparent optical material and produces the light-diffractive effect with phase distribution provided for the light transmitted through each of the micro-lenses.

Figure 6:
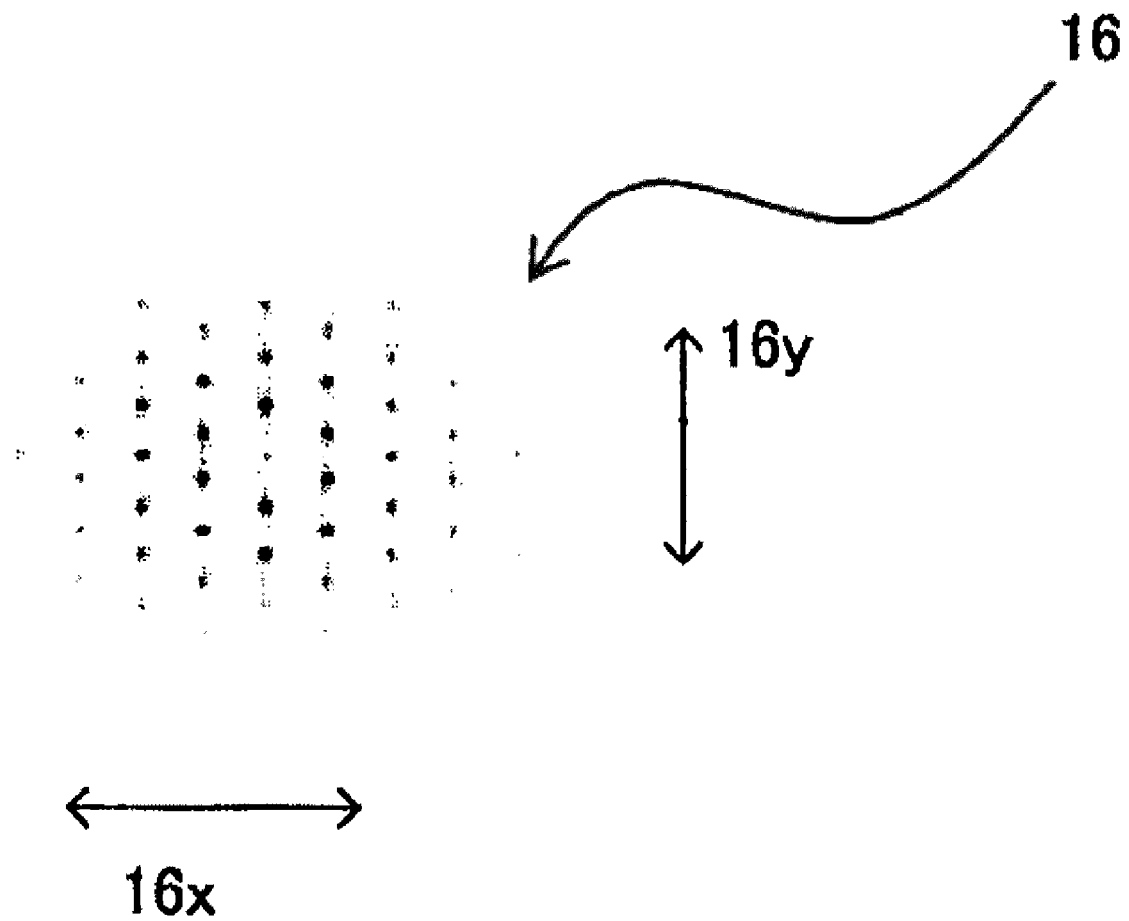
FIG. 6 is a figure showing a diffraction pattern provided by the diffractive optical element in Embodiment 1.

FIG. 6 shows a pattern 16 of the diffracted light emerging from the diffractive optical element 5 shown in FIG. 5A. In FIG. 6, a direction 16x corresponds to the horizontal direction (first periodic pitch direction), while a direction 16y orthogonal to the direction 16x corresponds to the vertical direction (third periodic pitch direction). As seen from FIG. 6, the diffracted light expands differently for the direction 16x and the direction 16y such that the expansion of the diffracted light in the direction 16x is larger than that of the diffracted light in the direction 16y.

The different periodic pitches in the different directions in the periodic structure on the diffractive optical element 5 can provide different distributions of light amount in the direction 16x and the direction 16y such that the distribution in the direction 16x is larger than the distribution in the direction 16y. As a result, the use efficiency of light can be increased.

Figure 7:
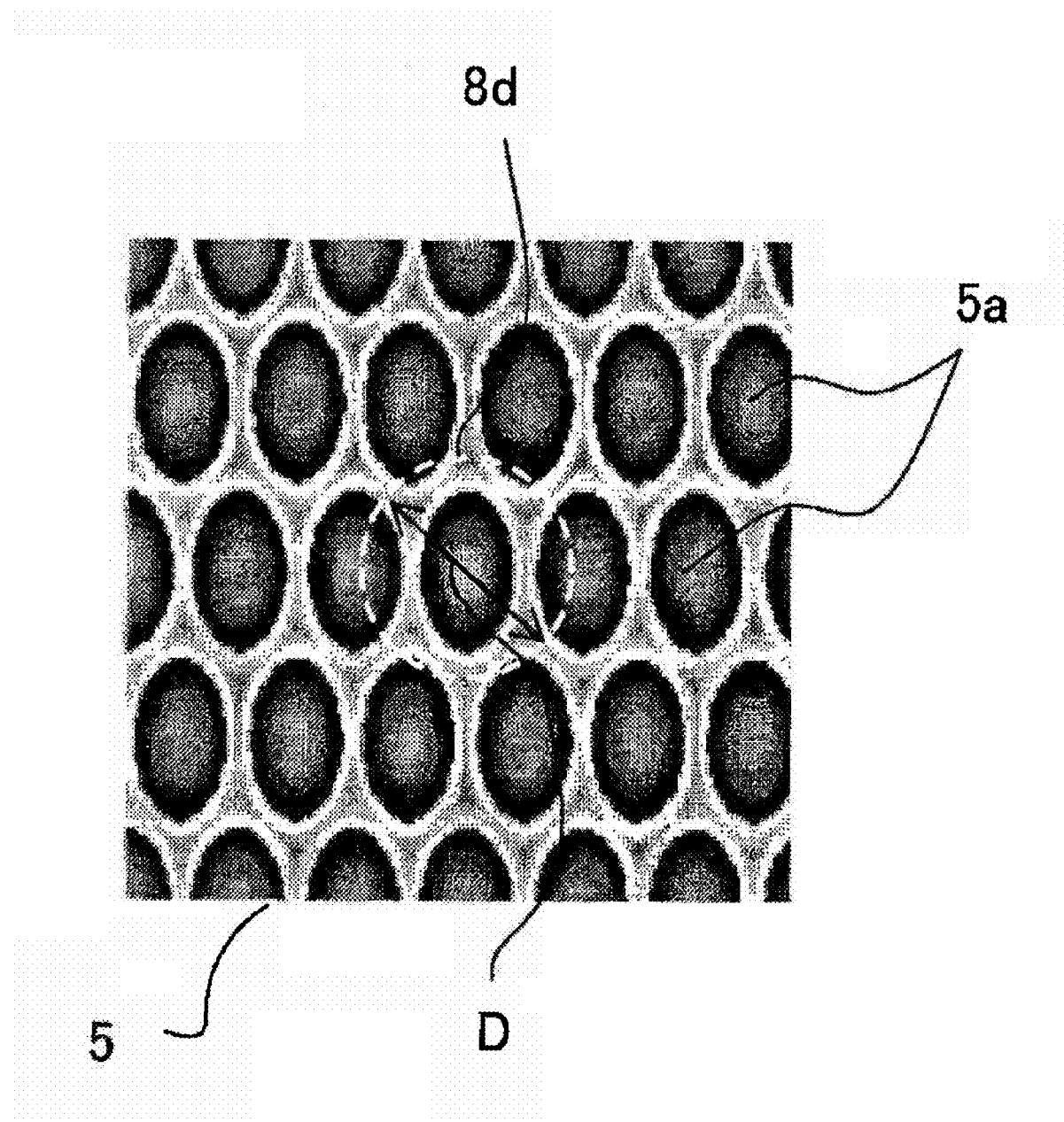
FIG. 7 shows the relationship between a periodic structure and a spot of incident light in the diffractive optical element in Embodiment 1.

FIG. 7 shows the relationship between the periodic structure (micro-lenses) 5a on the diffractive optical element 5 and the beam diameter D of the incident light flux 8d converged by the second optical system 4. Since the diffractive effect of light is provided by the periodic structure, the beam diameter (spot size) D in a certain direction on the periodic structure is desirably larger than the pitch p of the periodic structure in that direction. If the pitch p of the periodic structure is excessively smaller than the beam diameter D, the diffraction angle per order of diffraction is excessively increased, so that a loss of light amount tends to occur. Thus, the following is desirably satisfied:

$$1 < D/p < 5.$$

The beam diameter (spot size) D is defined by Full Width Half Maximum (FWHM) or $1/e^2$ of the peak light amount.

Figure 8A:
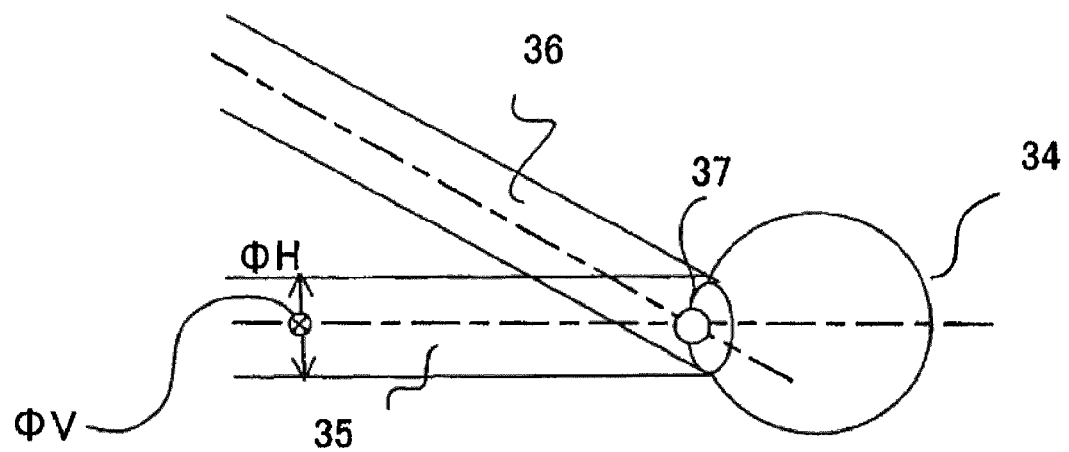
FIG. 8A is a figure showing the relationship between a light flux and an eye in observation of the center of an image.
Figure 8B:
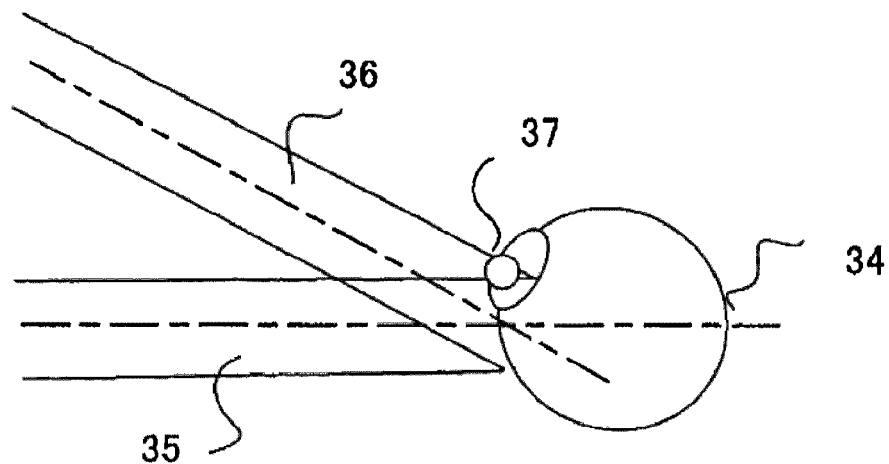
FIG. 8B is a figure showing the relationship between a light flux and the eye in observation of the end of the image.

Next, description will be made of how to specify the shape of the exit pupil. FIGS. 8A and 8B show the relationship between an eyeball 34 of an observer placed on the exit pupil and light fluxes 35 and 36 traveling toward the eyeball 34 on a horizontal section. FIG. 8A shows the observer looking at the center of an image, while FIG. 8B shows the eyeball 34 rotated to look at the end of the image.

To prevent blocking of the light flux 35 forming the center of the image even in the state of FIG. 8B, the light flux diameter (light flux width) φH is necessary in the horizontal direction as shown in FIG. 8A. On the other hand, in the vertical direction, the light flux diameter φV is necessary to avoid blocking of the light flux 35. The pupil diameter of the observer is typically set to 3 to 5 mm.

Typically, the image viewed by the observer has a dimension in a ratio of 4:3 or 16:9 between the lateral or horizontal direction and the longitudinal or vertical direction, and thus the image is horizontally oriented. The following needs to be satisfied:

$$1 < \phi H / \phi V \tag{1}$$

Figure 9:
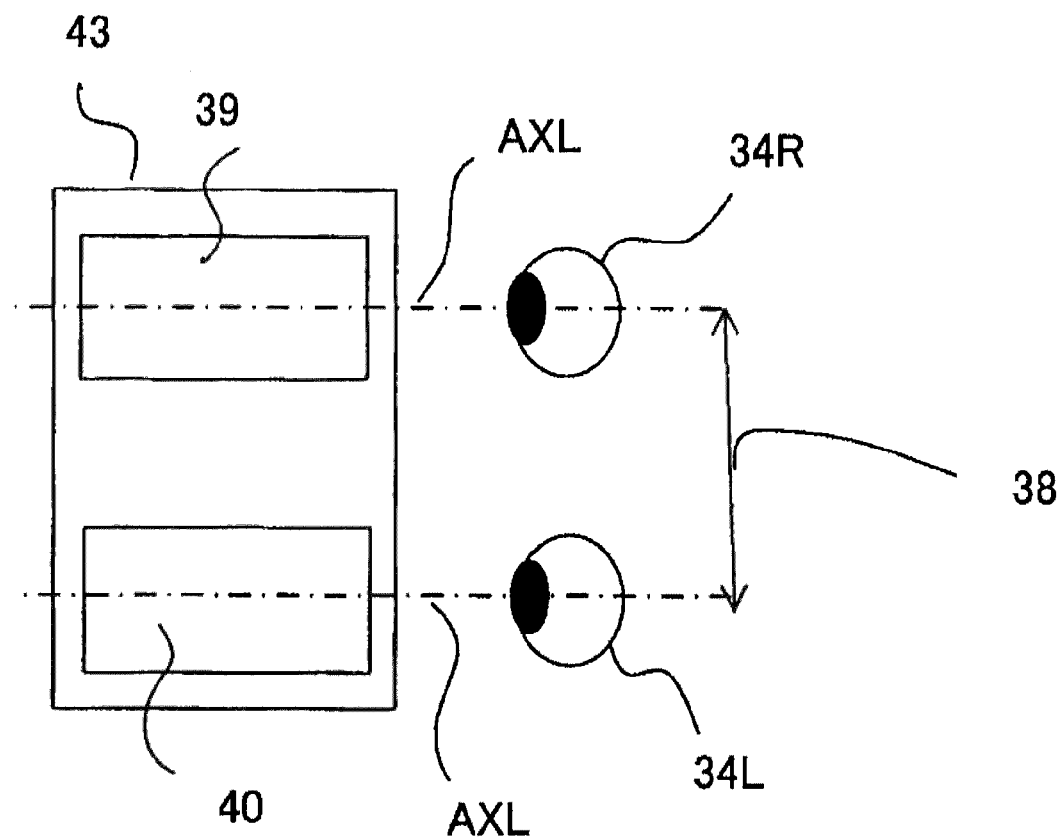
FIG. 9 is a figure showing a head-mounted image display apparatus in which the retinal scanning-type image display apparatus of Embodiment 1 is used.

FIG. 9 shows a head-mounted display (head-mounted image display apparatus) 43 which is configured by placing a pair of scanning-type image display apparatuses 39 and 40 in front of eyeballs 34R and 34L of an observer, respectively. Since an interpupillary distance 38 of the observer varies depending on their individuals, an amount of interpupillary distance adjustment is set to 5 mm which is a half of 10 mm of an interpupillary distance. The ratio of the lateral or horizontal dimension and the longitudinal or vertical dimension of the observed image, that is, the ratio of view angles (FovH: FovV) is 4:3.

For example, when the pupil diameter is 5 mm in the horizontal direction (lateral direction of the image), the pupil diameter in the vertical direction (longitudinal direction of the image) can be represented as 5×(FovV/FovH) mm=5×(3/4). When the pupil diameter of the observer is in the horizontal direction is 3 to 5 mm and the amount of the interpupillary distance adjustment is a half of 10 mm (5 mm on each side) of the interpupillary distance, the necessary diameter of the exit pupil in the horizontal direction is calculated as "5+5 mm=10 mm."

The following is calculated from $10/\{5\times(3/4)\}=2.66$:

$$1 < \phi H/\phi V < 2.66 \quad (2)$$

The expression (1) is rewritten with the horizontal view angle (display view angle in the first direction) FovH and the vertical view angle (display view angle in the second direction) FovV of the observed image:

$$FovH/FovV < \phi H/\phi V \quad (1)'$$

The expression (2) is rewritten assuming that the pupil diameter in the horizontal direction (lateral dimension of the image) is φ mm (φ=1 to 7 mm and typically φ=3 to 5 mm):

$$FovH/FovV < \phi H/\phi V < (\phi+5)/(\phi \times FovV/FovH) \quad (2)'$$

The ratio of expansions of the diffracted light in the directions 16x and 16y in FIG. 6, that is, the ratio of the light flux diameters is set to satisfy the expression (2) or (2)', thereby enabling formation of the exit pupil having an appropriate shape and size without blocking of the observed image and to reduce a loss of light amount.

Embodiment 2

Figure 10:
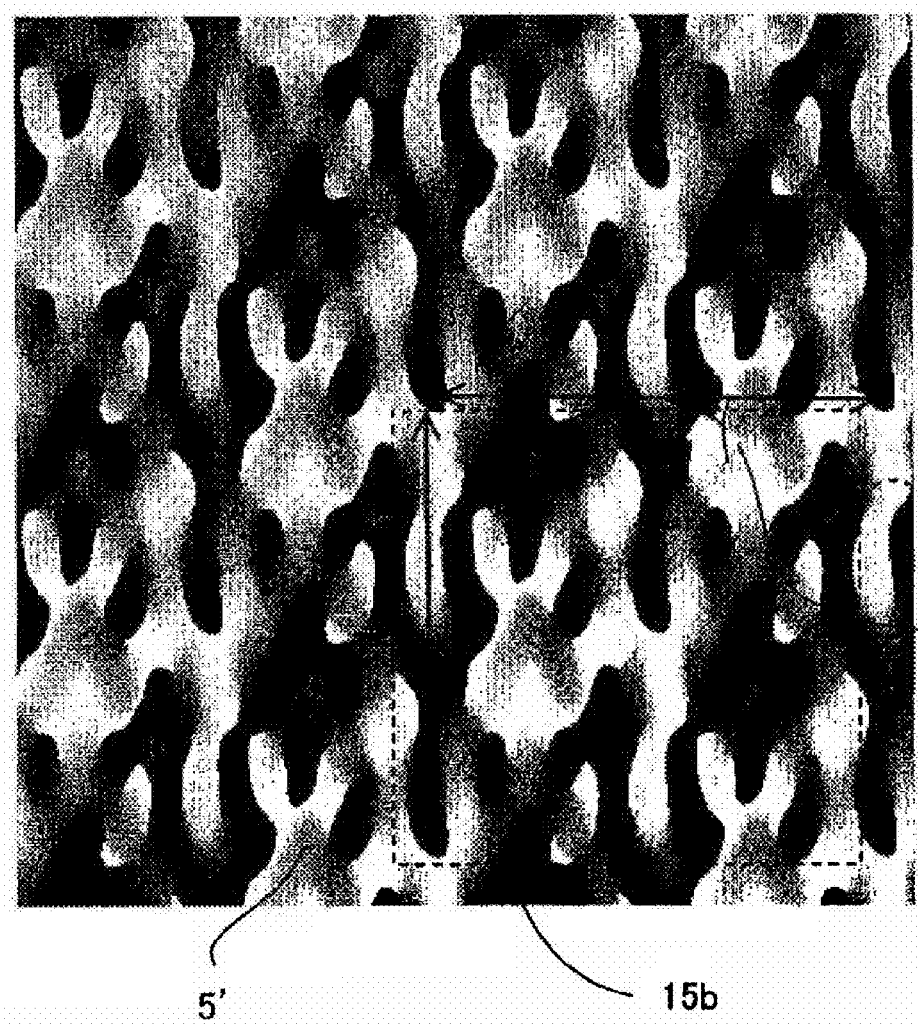
FIG. 10 is a figure showing the shape of a diffractive optical element used in a retinal scanning type image display apparatus which is Embodiment 2 of the present invention.

FIG. 10 shows a diffractive optical element 5' for use in a retinal scanning-type image display apparatus which is Embodiment 2 of the present invention. The diffractive optical element 5' has a shape different from that of the diffractive optical element 5 described in Embodiment 1. The overall configuration of the retinal scanning-type image display apparatus of Embodiment 2 is identical to that of Embodiment 1.

The diffractive optical element 5' shown in FIG. 10 is of a phase type. Black portions and white portions in FIG. 10 have different heights for forming the periodic structure of the diffractive optical element. Various phase differences of the light flux are produced depending on entering positions of the light flux into each periodic portion 5a' of the periodic structure. A pitch 15a of the periodic structure in a horizontal direction is equal to a pitch 15b thereof in a vertical direction, so that diffracted light is produced at regular intervals.

Figure 11:
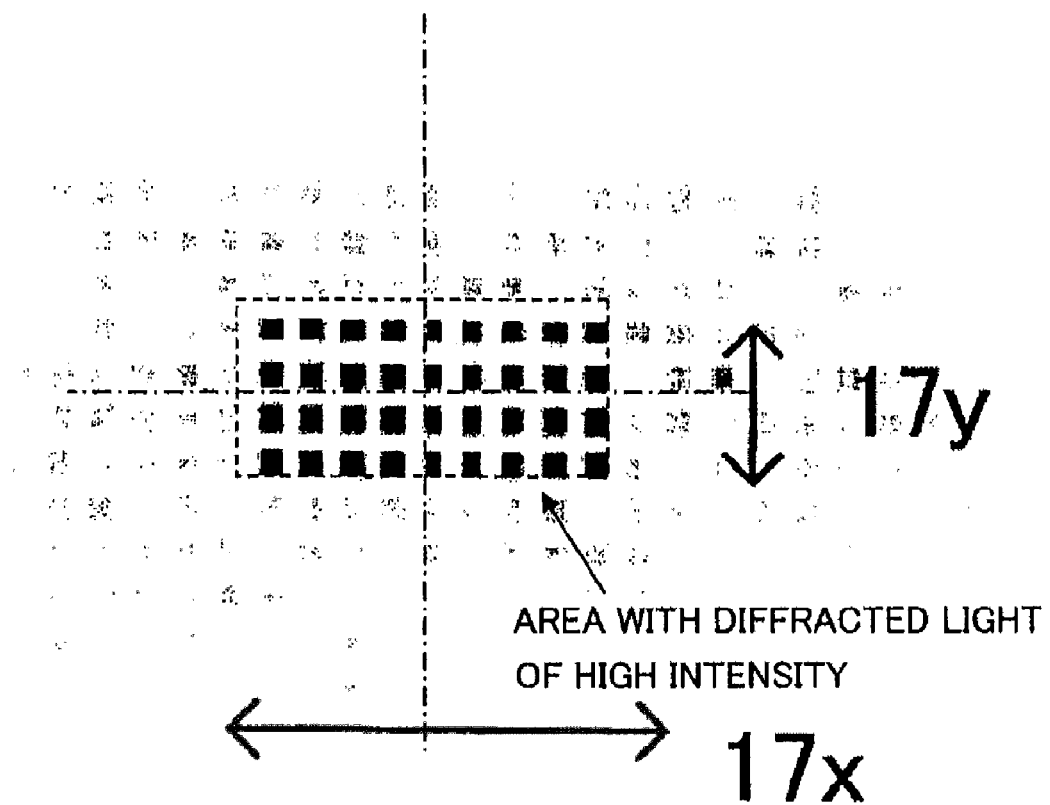
FIG. 11 is a figure showing a diffraction pattern provided by the diffractive optical element in Embodiment 2.

FIG. 11 shows the light intensity of a diffraction pattern from the diffractive optical element 5'. As seen from FIG. 11, an area with diffracted light of high intensity, that is, an area with high light intensity (area in which dark black dots are arranged), has different dimensions for a horizontal direction 17x and a vertical direction 17y.

Embodiment 3

Figure 12:
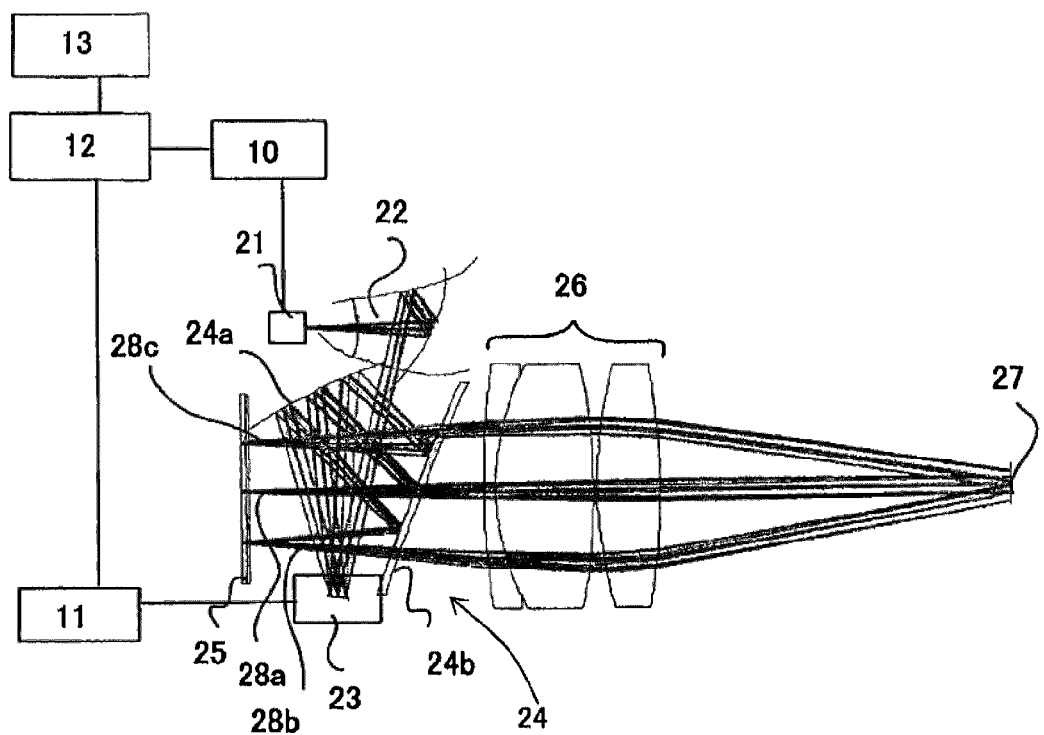
FIG. 12 is a figure showing the configuration of a retinal scanning-type image display apparatus which is Embodiment 3 of the present invention.

FIG. 12 shows the configuration of a retinal scanning-type image display apparatus which is Embodiment 3 of the present invention. A light source 21 can emit light with modulated intensity. A light flux emitted from the light source 21 passes through a first optical system 22, and then enters a two-dimensional scanning unit 23. The two-dimensional scanning unit 23 is identical to that described in Embodiment 1. The light flux deflected by the two-dimensional scanning unit 23 enters a second optical system 24.

The second optical system 24 in Embodiment 3 is formed of a mirror optical system 24a including two mirrors having an optical power (reciprocal of the focal length) and an optical system 24b having a transmission/reflection function and an optical power. On the optical path of the deflected light flux from the two-dimensional scanning unit 23 to a diffractive optical element 25, the optical system 24b serves as a reflecting optical system.

The second optical system 24 converges the light flux from the light source 21 at the position where the diffractive optical element 25 is placed, and forms a scanned surface. Light fluxes 28a, 28b, and 28c are examples of the light flux deflected by the two-dimensional scanning unit 23.

Preferably, the position of the diffractive optical element 25 coincides with the position of the scanned surface. However, they do not necessarily need to coincide with each other. That is, they only need to be placed within an area in which they can be considered to optically coincide with each other.

The diffractive optical element 25 of Embodiment 3 is of a reflection-type and has the function of diffracting the incident light flux when the element 25 reflects the light.

The light flux reflected and diffracted by the diffractive optical element 25 passes through the optical system 24b and then enters an ocular optical system 26. An observer puts his/her eye in the area where an exit pupil 27 is formed by the light flux emerging from the ocular optical system 26, so that he/she can observe an image formed on the above-mentioned scanned surface as a virtual image through the ocular optical system 26.

A light source control circuit 10, a scanning control circuit 11, a main control circuit 12, and an image information input circuit 13 have the same functions as those in Embodiment 1. The circuits 10 to 13 operate to provide an image in the same manner as described in Embodiment 1. As a result, the image corresponding to the image information input from an image supply apparatus, not shown, can be presented to the observer.

Figure 13A:
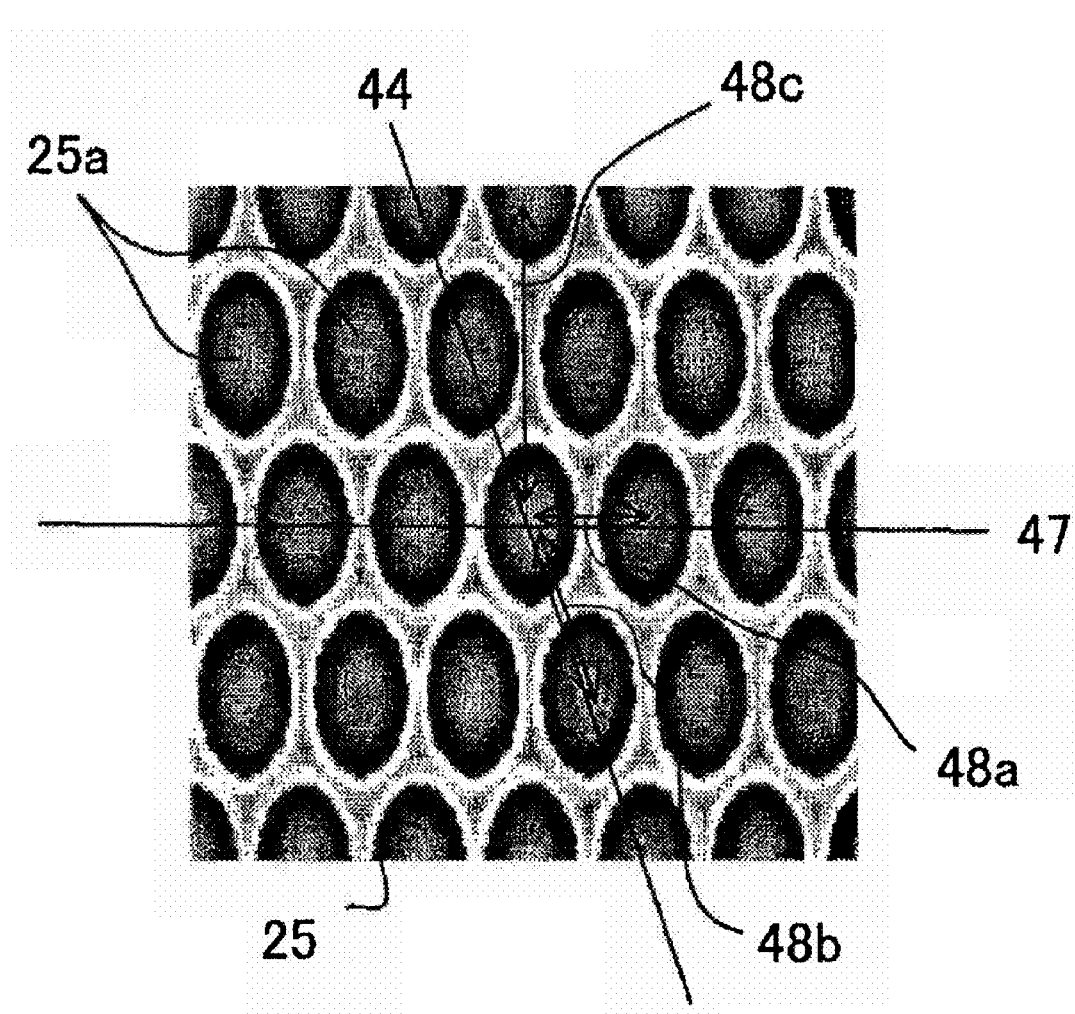
FIG. 13A is a figure showing the shape of a diffractive optical element used in the retinal scanning-type image display apparatus of Embodiment 3.
Figure 13B:
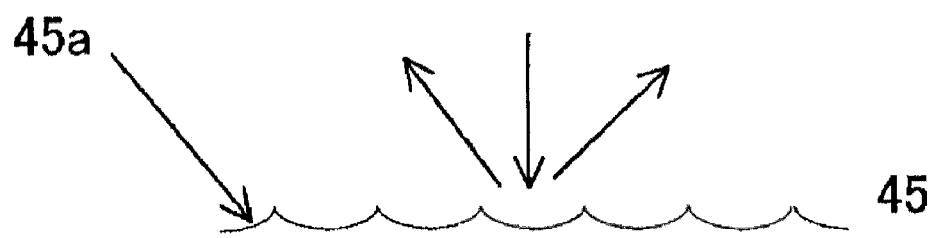
FIG. 13B is a figure showing the sectional shape of the diffractive optical element in Embodiment 3.
Figure 13C:
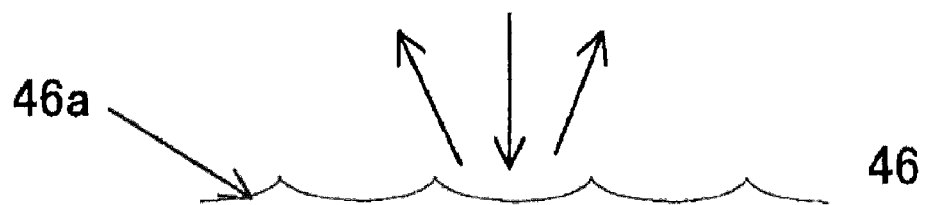
FIG. 13C is a figure showing the sectional shape of the diffractive optical element in Embodiment 3.

FIGS. 13A to 13C show examples of the shape of the diffractive optical element 25 of Embodiment 3. The diffractive optical element 25 is a reflective micro-lens array including a plurality of concave micro-lenses 25a arranged regularly as a periodic structure. The micro-lenses 25a are arranged with a first periodic pitch 48a in a horizontal direction 47 and with a second periodic pitch 48b larger than the first periodic pitch 48a in an inclined direction 44 with respect to the horizontal direction 47 and a vertical direction. The micro-lenses 25a are also arranged with a third periodic pitch 48b (a combined periodic pitch of the first periodic pitch 48a and the second periodic pitch 48b) 48c larger than the second periodic pitch in the vertical direction.

FIGS. 13B and 13C show the sectional shapes in the directions 47 and 44 for the periodic pitches 48a and 48b, respectively. The micro-lens array produces the diffractive effect of light with phase distribution provided for the light reflected by the concave surface of each of the micro-lenses 25a. A reflecting film is formed on each of lens surfaces 45a and 46a of the micro-lenses 25a in the sectional view of FIGS. 13B and 13C.

Figure 14:
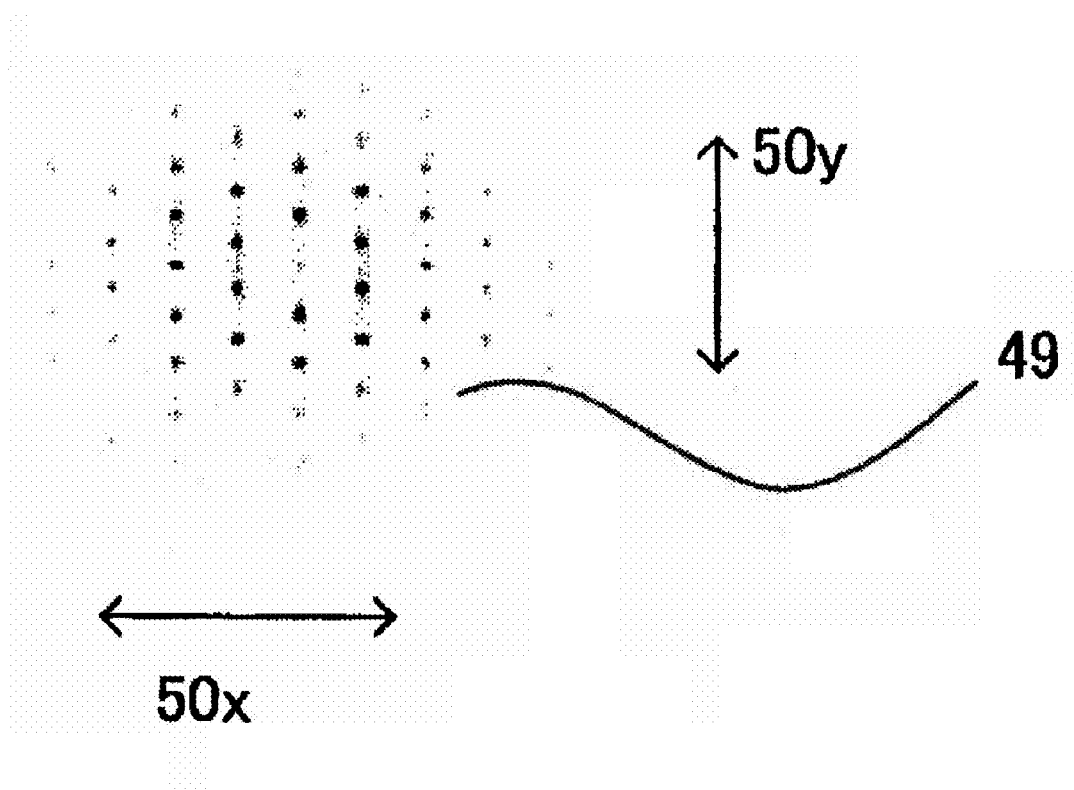
FIG. 14 is a figure showing a diffraction pattern provided by the diffractive optical element in Embodiment 3.

FIG. 14 shows a pattern 49 of the diffracted light reflected by the diffractive optical element 25 shown in FIG. 13A. In FIG. 14, a direction 50x corresponds to the horizontal direction, while a direction 50y orthogonal to the direction 50x corresponds to the vertical direction (the direction of combined periodic pitch direction of the first periodic pitch 48a and the second periodic pitch 48b).

As seen from FIG. 14, the diffracted light expands differently for the direction 50x and the direction 50y such that the expansion of the diffracted light in the direction 50x is larger than that of the diffracted light in the direction 50y.

The different periodic pitches in the different directions in the periodic structure on the diffractive optical element 25 can provide different distributions of light amount in the direction 50x and the direction 50y such that the distribution in the direction 50x is larger than the distribution in the direction 50y. As a result, the use efficiency of light can be increased.

While the micro-lens array of the reflective type is described as the diffractive optical element 25 in Embodiment 3, it is possible to use a reflective diffractive optical element configured like a phase plate described in Embodiment 2.

Since the diffractive effect of light is provided by the periodic structure in the diffractive optical element 25 also in Embodiment 3, the beam diameter (spot size) D in a certain direction on the periodic structure is desirably larger than the pitch p of the periodic structure in that direction. If the pitch p of the periodic structure is excessively smaller than the beam diameter D, the diffraction angle per order of diffraction is excessively increased, so that a loss of light amount tends to occur. Thus, the following is desirably satisfied:

$1<D/p<5$

The beam diameter (spot size) D is defined by Full Width Half Maximum (FWHM) or $1/e^2$ of the peak light amount.

As described above, according to Embodiments 1 to 3, the diffractive optical element not only increases the divergent angle in the first and second directions but also provides the divergent angle in the first direction larger than that in the second direction. Thus, especially, the size of the exit pupil can be increased in a desired direction (second direction). As a result, the retinal scanning-type image display apparatus and the head-mounted image display apparatus can be realized which have the exit pupil with a shape facilitating observation of an image by an observer and which achieve the enhanced use efficiency of light from the light source, that is, a smaller loss of light from the light source, to enable observation of a bright image.

While each of Embodiments 1 to 3 has shown only one light source, a color image can be presented by using a light source which emits light in colors of red, blue, and green.

Each of Embodiments 1 to 3 has been described mainly for the purpose of increasing the use efficiency of light from the light source by setting the shape of the exit pupil to have different dimensions for the two directions orthogonal to each other. It is also possible to prevent occurrence of stray light by precluding light from proceeding in directions other than the necessary direction.

Furthermore, the present invention is not limited to these embodiments and various variations and modifications may be made without departing from the scope of the present invention.

This application claims foreign priority benefits based on Japanese Patent Application No. 2006-219685, filed on Aug. 11, 2006, which is hereby incorporated by reference herein in its entirety as if fully set forth herein.

The invention claimed is:

1. A scanning type image display apparatus comprising:
a scanning unit which two-dimensionally scans a light flux;
a first optical system which introduces a light flux from a light source to the scanning unit;
a second optical system which converges the light flux from the scanning unit;
a diffractive optical element which receives the converged light flux from the second optical system; and
an ocular optical system which introduces the light flux from the diffractive optical element to an eye of an observer,
wherein, when two directions orthogonal to each other in diametral directions of the light flux from the second optical system are a first direction and a second direction, the diffractive optical element has a function of increasing divergent angles of an emerging light flux from the diffractive optical element in the first and second directions as compared with convergent angles of an incident light flux entering the diffractive optical element in the first and second directions and a function of increasing the divergent angle of the emerging light flux in the first direction as compared with the divergent angle thereof in the second direction,
wherein the first direction corresponds to a direction of a long side of a display image and the second direction corresponds to a direction of a short side of the display image.

2. The apparatus according to claim 1, wherein a scanned surface of the light flux scanned by the scanning unit is formed between the second optical system and the ocular optical system, and
wherein the diffractive optical element is placed in an area where the scanned surface is formed.

3. The apparatus according to claim 1, wherein the following condition is satisfied:

$1<\phi H/\phi V<2.66$ where $\phi H$ represents a width of the emerging light flux from the diffractive optical element in the first direction, and $\phi V$ represents a width of the emerging light flux in the second direction.

4. The apparatus according to claim 1, wherein the diffractive optical element has a periodic structure in the first and second directions, and
wherein a periodic pitch of the periodic structure in the first direction is smaller than that in the second direction.

5. The apparatus according to claim 1, wherein the diffractive optical element has a periodic structure in the first and second directions, and
the diffractive optical element produces different phase differences of the light flux depending on entering positions thereof into each periodic portion of the periodic structure.

6. An image display system comprising:
the scanning type image display apparatus according to claim 1; and
an image supply apparatus which supplies image information to the scanning type image display apparatus.

* * * * *